United States Patent
Wise (10) Patent No.: US 9,943,963 B2
(45) Date of Patent: Apr. 17, 2018

(54) SYSTEM AND METHOD FOR DETERMINING AND PROMOTING SAFETY OF A ROBOTIC PAYLOAD

(71) Applicant: Fetch Robotics, Inc., San Jose, CA (US)

(72) Inventor: Melonee Wise, San Jose, CA (US)

(73) Assignee: Fetch Robotics, Inc., San Jose, CA (US)

( * ) Notice: Subject to any disclaimer, the term of this patent is extended or adjusted under 35 U.S.C. 154(b) by 136 days.

(21) Appl. No.: 15/096,921

(22) Filed: Apr. 12, 2016

(65) Prior Publication Data

US 2017/0291315 A1  Oct. 12, 2017

(51) Int. Cl.
- *G05B 15/00* (2006.01)
- *G05B 19/00* (2006.01)
- *B25J 9/16* (2006.01)

(52) U.S. Cl.
CPC .......... *B25J 9/1674* (2013.01); *B25J 9/1651* (2013.01); *B25J 9/1694* (2013.01); *Y10S 901/01* (2013.01)

(58) Field of Classification Search
None
See application file for complete search history.

(56) References Cited

U.S. PATENT DOCUMENTS

| | | | | | |
|---|---|---|---|---|---|
| 4,516,116 | A | * | 5/1985 | White | B66C 23/905 340/665 |
| 5,032,821 | A | * | 7/1991 | Domanico | B60G 17/0185 180/197 |
| 6,069,324 | A | * | 5/2000 | Shimizu | B60P 1/045 177/136 |
| 8,280,547 | B2 | * | 10/2012 | D'Andrea | B66F 9/063 700/214 |
| 8,798,786 | B2 | * | 8/2014 | Wurman | B65F 3/00 700/214 |
| 8,983,647 | B1 | * | 3/2015 | Dwarakanath | G06Q 10/087 700/216 |
| 9,008,827 | B1 | * | 4/2015 | Dwarakanath | G06Q 10/087 700/213 |
| 9,087,314 | B2 | * | 7/2015 | Hoffman | G06Q 10/087 |
| 9,111,251 | B1 | * | 8/2015 | Brazeau | G06Q 10/087 |
| 9,120,622 | B1 | * | 9/2015 | Elazary | B65G 1/1373 |
| 9,367,830 | B2 | * | 6/2016 | Keller | B65G 1/1373 |
| 9,378,482 | B1 | * | 6/2016 | Pikler | G06Q 10/087 |
| 9,409,711 | B1 | * | 8/2016 | Hanssen | B65G 1/1378 |
| 9,688,472 | B1 | * | 6/2017 | Stubbs | B65G 1/1373 |
| 2003/0006340 | A1 | * | 1/2003 | Harrison | B64C 29/0075 244/12.3 |
| 2003/0050735 | A1 | * | 3/2003 | Griffis | G05B 19/4061 700/255 |

(Continued)

*Primary Examiner* — Bhavesh V Amin

(74) *Attorney, Agent, or Firm* — J. Steven Svoboda (57) ABSTRACT

A system for determining and promoting safety of a robotic payload, including: a controller; and a robot controllable by the controller, the robot comprising: at least one payload region configured to carry a payload; a sensor configured to detect at least one of a payload mass and a payload distribution, the sensor further configured to alert the controller regarding the one or more of a payload mass and a payload distribution, the controller further configured to perform, in response to the alert, one or more of determining safety of the payload and promoting the safety of the payload.

38 Claims, 6 Drawing Sheets

(56) References Cited

U.S. PATENT DOCUMENTS

| | | | |
|---|---|---|---|
| 2003/0120455 A1* | 6/2003 | Sorrells | G01G 19/08 702/174 |
| 2004/0226755 A1* | 11/2004 | Pottebaum | G01G 19/12 177/25.13 |
| 2005/0071048 A1* | 3/2005 | Watanabe | B25J 9/1664 700/259 |
| 2007/0296173 A1* | 12/2007 | Regnell | B60G 17/0152 280/124.1 |
| 2008/0047375 A1* | 2/2008 | Sonoura | G05D 1/0891 74/5.22 |
| 2008/0269986 A1* | 10/2008 | Regnell | B60G 17/019 701/37 |
| 2009/0185884 A1* | 7/2009 | Wurman | B65G 1/1378 414/270 |
| 2010/0114437 A1* | 5/2010 | Boss | B60K 28/08 701/48 |
| 2012/0016538 A1* | 1/2012 | Waite | G01C 21/20 701/3 |
| 2012/0265401 A1* | 10/2012 | Stuetzler | B60W 40/12 701/38 |
| 2013/0151007 A1* | 6/2013 | Valpola | B25J 9/1694 700/245 |
| 2014/0100998 A1* | 4/2014 | Mountz | G06Q 10/08 705/28 |
| 2015/0032252 A1* | 1/2015 | Galluzzo | B25J 5/007 700/218 |
| 2015/0073589 A1* | 3/2015 | Khodl | B25J 5/007 700/218 |
| 2016/0059963 A1* | 3/2016 | Burgess | B64D 1/12 701/49 |
| 2016/0101940 A1* | 4/2016 | Grinnell | G05D 1/0297 700/216 |

* cited by examiner

SYSTEM AND METHOD FOR DETERMINING AND PROMOTING SAFETY OF A ROBOTIC PAYLOAD

PRIORITY CLAIM

The present application claims the priority benefit of U.S. provisional patent application No. 62/146,396 filed Apr. 12, 2015 and entitled "System and Method for Determining and Promoting Safety of a Robotic Payload," the disclosure of which is incorporated herein by reference.

SUMMARY

Embodiments of this invention relate in general to a system and method for determining and promoting safety of a payload. More specifically, embodiments of this invention relate in general to a system and method for determining and promoting safety of a robotic payload.

A system for determining and promoting safety of a robotic payload, including: a controller; and a robot controllable by the controller, the robot comprising: at least one payload region configured to carry a payload; a sensor configured to detect at least one of a payload mass and a payload distribution, the sensor further configured to alert the controller regarding the one or more of a payload mass and a payload distribution, the controller further configured to perform, in response to the alert, one or more of determining safety of the payload and promoting the safety of the payload.

A method for determining and promoting safety of a robotic payload includes: detecting, by a sensor comprised in a robot controllable by a controller, the robot including at least one payload region configured to carry a payload, at least one of a payload mass and a payload distribution; and alerting the controller, by the sensor, regarding the one or more of a payload mass and a payload distribution.

A method for determining and promoting safety of a robotic payload includes: receiving, by a controller controlling a robot that comprises a sensor and further includes at least one payload region configured to carry a payload, from the sensor, at least one of a payload mass and a payload distribution; receiving, by the controller, from the sensor, an alert regarding the one or more of a payload mass and a payload distribution; generating, by the controller, using the alert, a safety message; and sending, by the controller, to a user, the safety message.

DETAILED DESCRIPTION

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

Embodiments of this invention relate in general to a system and method for determining and promoting safety of a payload, and more particularly to a system and method for determining and promoting the safety of a robotic payload, and still more particularly to a system and method for determining and promoting the safety of one or more of a robotic payload's mass and a robotic payload's distribution.

The system for determining and promoting safety of a robotic payload includes a plurality of components such as one or more of electronic components, hardware components, and computer software components. A number of such components can be combined or divided in the system. An example component of the system includes a set and/or series of computer instructions written in or implemented with any of a number of programming languages, as will be appreciated by those skilled in the art.

The system in one example employs one or more computer-readable signal-bearing media. The computer-readable signal bearing media store software, firmware and/or assembly language for performing one or more portions of one or more implementations of the invention. The computer-readable signal-bearing medium for the system in one example comprises one or more of a magnetic, electrical, optical, biological, and atomic data storage medium. For example, the computer-readable signal-bearing medium comprises floppy disks, magnetic tapes, CD-ROMs, DVD-ROMs, hard disk drives, downloadable files, files executable "in the cloud," and electronic memory.

According to embodiments of the invention, a system for determining and promoting the safety of a robotic payload comprises a controller and further comprises a robot. For example, the robot is controllable by the controller. For example, the robot comprises at least one payload region configured to carry a payload. Typically, although not necessarily, the robot comprises the controller. For example, the robot does not comprise the controller.

According to embodiments of the invention, the robot further comprises a sensor array comprising one or more sensors. For example, the sensor array comprises at least two sensors. For example, one or more of the sensors comprises a pad. For example, one or more of the sensors comprises a sensor other than a pad. For example, one or more of the sensors comprises a resistive pressure pad. For example, one or more of the sensors comprises one or more of a piezoelectric sensor, a piezoresistive sensor, a strain gauge sensor, a capacitive sensor, and another type of sensor.

According to embodiments of the invention, the sensor array is configured to detect a payload parameter. For example, the payload parameter comprises one or more of a payload mass and a payload distribution. For example, the sensor array is configured to sense a change in the payload parameter. For example, the payload mass changes if a payload item falls from the robot during transport.

For example, the sensor array is configured to alert the controller regarding the change in the payload parameter. For example, the alert reports a change in the payload parameter. For example, the controller is configured to receive the alert from the sensor array.

According to other embodiments of the invention, the controller is configured to perform, in response to the alert, one or more of determining safety of the payload and promoting the safety of the payload. For example, the controller is further configured to perform, in response to the alert, one or more of stopping the robot, notifying a human operator, reconfiguring the payload, and taking an other step to promote payload safety.

For example, the controller is configured to adjust, in response to the alert, one or more of a linear velocity, an angular velocity, a path, and a payload of the robot.

For example, the controller is configured to use the alert to generate a safety message. The controller is further configured to send the safety message to a user. The controller is further configured to send the safety message to the sensor.

The safety message may comprise one or more of a safety determination and a safety promotion order.

For example, determining safety comprises one or more of determining the safety of the robot continuing to perform a designated task, determining the safety of the robot performing a new task, determining the safety of allowing the robot to continue operating, determining the safety of stopping the robot, determining if the payload differs significantly from an expected payload, and another safety determination.

For example, determining if the payload differs significantly from an expected payload comprises one or more of determining if the payload mass differs significantly from an expected payload mass and determining if the payload distribution differs significantly from an expected payload distribution. For example, the controller is configured to determine if the payload mass exceeds the expected payload mass. According to further embodiments of the invention, the controller is configured to determine if the payload distribution needs to be adjusted. For example, the controller is configured to determine a center of mass of the robotic payload.

For example, the controller is configured to determine when it is safe for the robot to continue operating. For example, the controller is configured, upon determining that it is not safe for the robot to continue operating, to order the robot to stop.

For example, promoting safety comprises one or more of ordering the robot to stop, ordering the robot to stop performing its current task, ordering the robot to start performing a new task, changing the robotic trajectory, ordering reconfiguration of the robotic payload, contacting a human operator, and another safety promotion. Changing the robot's trajectory comprises changing one or more of the path, velocity, angular velocity, acceleration, and angular acceleration of the robot.

A user may perform the ordered reconfiguration of the payload. Alternatively, or additionally, a robotic appendage may perform the reconfiguration of the payload. For example, a robotic arm may perform the reconfiguration of the payload. According to yet further embodiments of the invention, the controller may be configured to adjust, in response to the alert, one or more of the robot's speed and the robot's path.

Figure 1A:
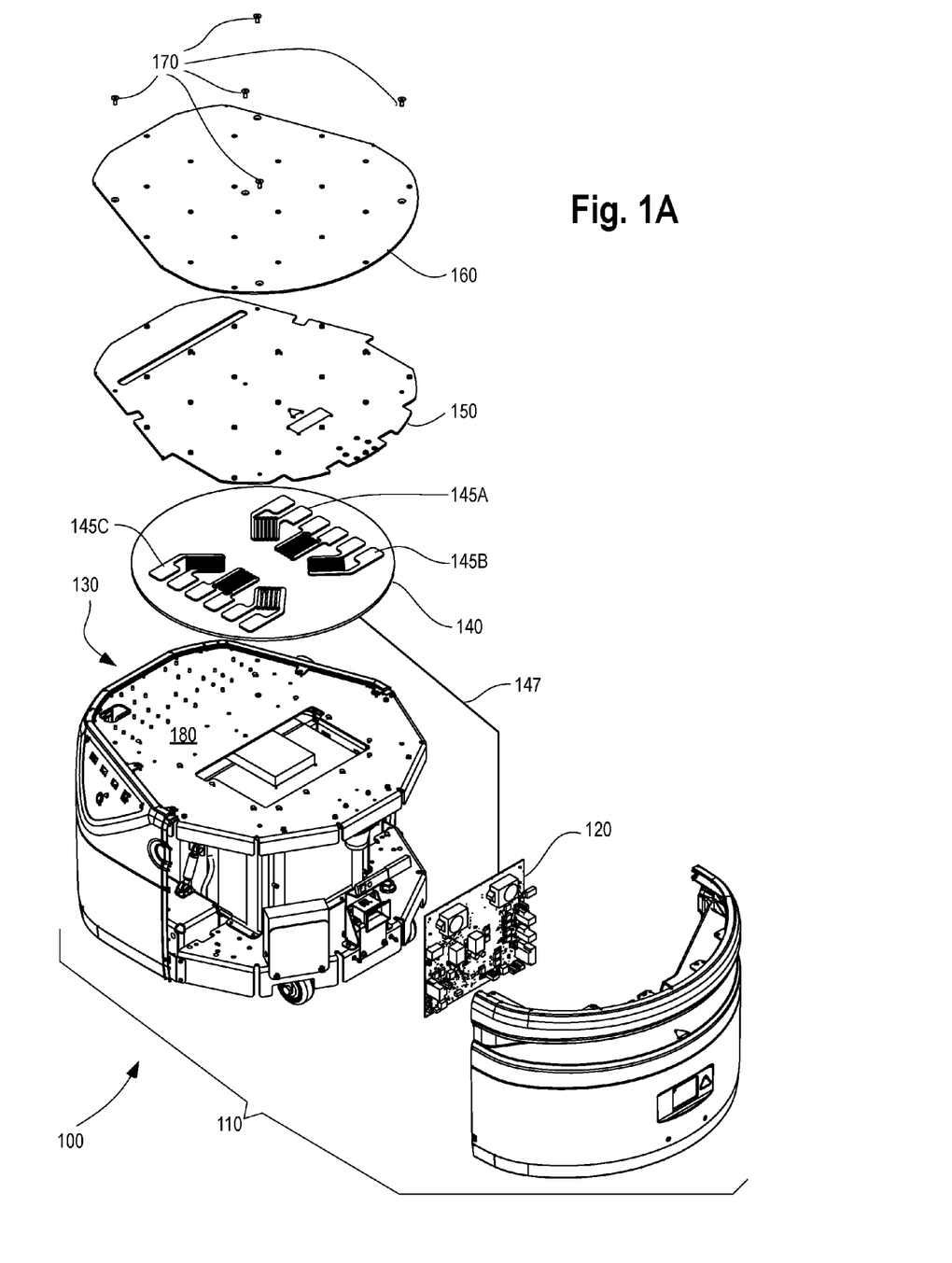
FIGS. 1A-1B are a pair of drawings showing components of a system for determining and promoting safety of a robotic payload.

FIG. 1A is an exploded drawing showing components of a system 100 for determining and promoting safety of a robotic payload. The system 100 comprises a robot 110. The robot 110 comprises a controller 120, a mobile robotic base 130, a sensor array 140 comprising one or more sensors 147A-147G, operably connected to the controller 120 by an electrical connection 145, a top plate 150, a face plate 160, and fasteners 170. The sensor array 140 is operably connected to the controller 120 by one or more of an electrical connection 147 and a wireless connection. The sensor array 140 comprises one or more sensors (not shown). For example, the sensor array 140 comprises sixteen sensors (not shown), a first sensor, a second sensor . . . and a sixteenth sensor. The fasteners 170 pass through respective holes in the face plate 160 and through respective holes in the top plate 150 and fasten into a payload region 180 of the robot 110. For example, the fasteners 170 comprise screws 170. For example, the fasteners 170 comprise non-screw fasteners 170.

Figure 1B:
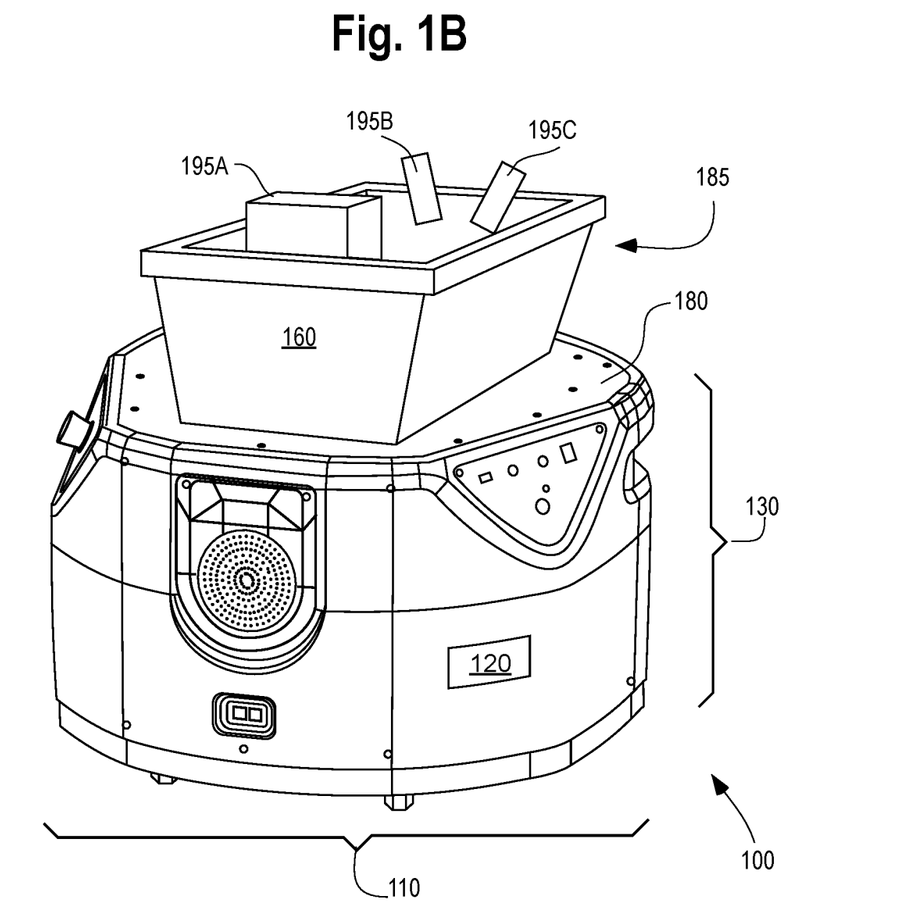

FIG. 1B is a drawing showing components of a system 100 for determining and promoting safety of a robotic payload. The system 100 comprises a robot 110. The robot 110 comprises the controller 120, the mobile robotic base 130 and the payload region 180.

The payload region 180 may, and as depicted, does further comprise a payload 185. The payload 185 may, and as depicted, does comprise an inventory holder 190. For example, the inventory holder 190 comprises a bin 190. For example, the inventory holder 190 comprises another type of inventory holder 190. The inventory holder 190 may comprise one or more payload items.

Any number of payload items 195A, 195B, 195C . . . 195i is possible. As depicted, the inventory holder 160 comprises a first payload item 195A, a second payload item 195B, and a third payload item 195C. For example, at least one of the first payload item 195A, the second payload item 195B, and the third payload item 195C is positioned so as to be detectable by the sensor array (not shown in FIG. 1B; item 140 in FIG. 1A). Preferably, although not necessarily, each of the first payload item 195A, the second payload item 195B, and the third payload item 195C is positioned on the payload region 180 so as to be detectable by the sensor array (not shown in FIG. 1B; item 140 in FIG. 1A).

For example, at least one of the first payload item 195A, the second payload item 195B, and the third payload item 195C is positioned on the payload region 180 so as to be detectable by the sensor array (not shown in FIG. 1B; item 140 in FIG. 1A). Preferably, although not necessarily, each of the first payload item 195A, the second payload item 195B, and the third payload item 195C is positioned on the payload region 180 so as to be detectable by the sensor array (not shown in FIG. 1B; item 140 in FIG. 1A).

For example, at least one of the sensors 145A, 145B . . . 145P is configured to sense the locations of one or more of the payload items. Preferably, although not necessarily, each of the sensors 145A, 145B . . . 145P is configured to sense the locations of one or more the payload items.

For example, at least one of the sensors 145A, 145B . . . 145P is mounted under the payload region 180 of the robot. Preferably, although not necessarily, each of the sensors 145A, 145B . . . 145P is mounted under the payload region 180 of the robot. Preferably, although not necessarily, each of the sensors 145A, 145B . . . 145P is configured to sense the locations of one or more the payload items.

The sensor array 140 is configured to detect a payload change. For example, the payload change comprises a change in one or more of payload mass and payload distribution. For example, the sensor array 140 is configured to sense a change in payload mass if a payload item falls from the robot during transport.

For example, the sensor array 140 is configured to alert the controller 120 regarding the payload change. For example, the controller 120 is configured to receive the alert from the sensor array 140.

In an alternative embodiment, the sensor array 140 comprises a processor (not shown) configured to perform one or more steps in determining and promoting safety of a robotic payload. In this alternative embodiment, the processor may be configured to perform all steps in determining and promoting safety of a robotic payload, so that the controller 120 is not necessary.

The controller 120 is configured to analyze data received from the sensor array 140. The controller 120 is further configured to determine whether a change has occurred in the payload 185. The controller 120 is further configured to compute a center of mass of the payload 185. The controller 120 computes the center of mass of the robotic payload using one or more of a location of one or more the sensors 145A, 145B . . . 145P, a first payload mass $M_1$, a second payload mass $M_2$, and a third payload mass $M_3$.

The controller 120 is further configured, using the computed payload center of mass, to compute a maximum velocity of the robot 110. For example, the maximum velocity comprises a maximum linear velocity of the robot 110. For example, the maximum velocity comprises a maximum angular velocity of the robot 110.

The controller 120 is configured to perform, in response to the alert, one or more of determining safety of the payload 185 and promoting the safety of the payload 185.

For example, determining safety comprises one or more of determining the safety of the robot 110 continuing to perform a designated task, determining the safety of the robot 110 performing a new task, determining the safety of allowing the robot 110 to continue operating, determining the safety of stopping the robot 110, determining if the payload 185 differs significantly from an expected payload, and another safety determination. For example, determining safety comprises computing a center of mass of the robotic payload.

For example, determining if the payload 185 differs significantly from an expected payload comprises one or more of determining if the payload mass differs significantly from an expected payload mass and determining if the payload distribution differs significantly from an expected payload distribution. For example, the controller 120 is configured to determine if the payload mass exceeds the expected payload mass. According to further embodiments of the invention, the controller 120 is configured to determine if the payload distribution needs to be adjusted.

For example, promoting safety comprises one or more of ordering the robot 110 to stop, ordering the robot 110 to stop performing a current task, ordering the robot 110 to start performing a new task, changing the trajectory of the robot 110, ordering reconfiguration of the robotic payload 185, contacting a human operator, and another safety promotion. Changing the trajectory of the robot 110 comprises changing one or more of the path, velocity, angular velocity, acceleration, and angular acceleration of the robot 110.

A user may perform the ordered reconfiguration of the payload 185. Alternatively, or additionally, a robotic appendage (not shown) may perform the reconfiguration of the payload 185. For example, a robotic arm may perform the reconfiguration of the payload 185. According to yet further embodiments of the invention, the controller 120 may be configured to adjust, in response to the alert, one or more of the speed and the path of the robot 110.

The controller 120 is further configured to determine whether the computed maximum velocity of the robot 110 is approximately equal to or greater than a required minimum velocity. The robot must move at a speed of at least approximately the required minimum velocity.

The controller 120 is further configured to wait for one or more of a user confirmation of the notification and a reconfiguration of the payload. The user may perform the reconfiguration of the payload. Alternatively, or additionally, a robotic appendage may perform the reconfiguration of the payload. For example, a robotic arm may perform the reconfiguration of the payload.

Alternatively, the robot 110 may not comprise the controller 120. That is, in this alternative embodiment, the system comprises the robot 110 and the separate controller 120.

Figure 2:
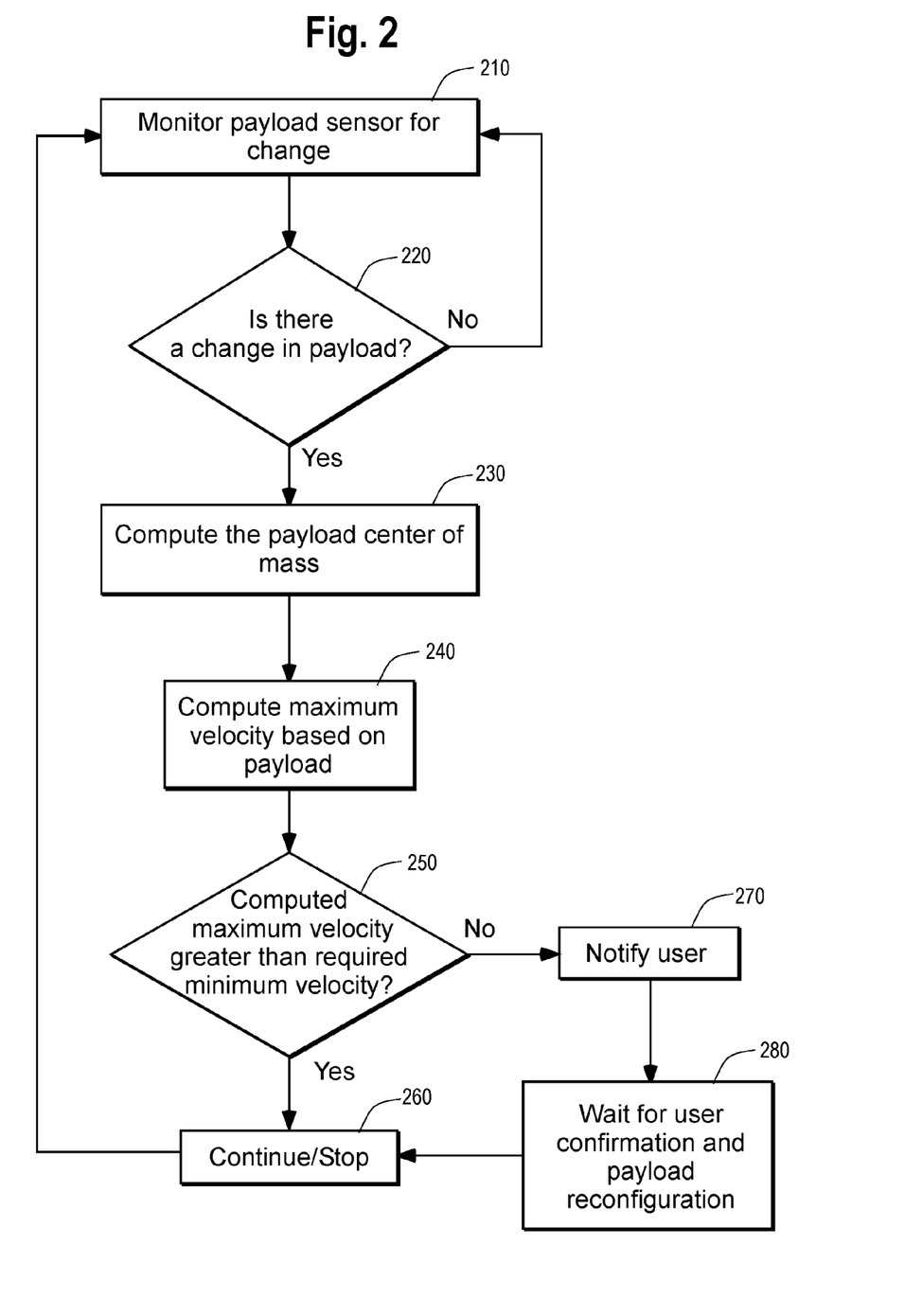
FIG. 2 is a flowchart of a method for determining and promoting safety of a robotic payload.

FIG. 2 is a flowchart of a method 200 for determining and promoting safety of a robotic payload. The order of the steps in the method 200 is not constrained to that shown in FIG. 2 or described in the following discussion. Several of the steps could occur in a different order without affecting the final result.

The steps are here described as performed by the controller. In an alternative embodiment, the sensor array comprises a processor configured to perform one or more of the steps.

In step 210, the controller monitors the sensor array for data indicating a change in payload. Block 210 then transfers control to block 220.

In step 220, the controller analyzes sensor data received from the sensor array and determines whether a change has occurred in the payload. Alternatively, or additionally, the controller determines whether an alert has been received from the sensor array. If yes, block 220 then transfers control to block 230. If no, block 220 then transfers control back to block 210.

In step 230, in response to the alert, the controller performs one or more of determining safety of the payload and promoting the safety of the payload. For example, the controller computes a center of mass of the payload. Block 230 then transfers control to block 240.

In step 240, using the computed payload center of mass, the controller computes a maximum velocity of the robot. For example, the maximum velocity comprises a maximum linear velocity of the robot. For example, the maximum velocity comprises a maximum angular velocity of the robot. Block 240 then transfers control to block 250.

In block 250, the controller determines whether the computed maximum velocity is approximately equal to or greater than a required minimum velocity.

If the answer in block 250 is yes, then the process continues to block 260. Optionally, the process terminates in block 260. Alternatively, from block 260, the process loops back to block 210.

If the answer in block 250 is no, then a reconfiguration will be required. If the answer in block 250 is no, then the process continues to block 270. In block 270, a user is notified that the computed maximum velocity is not approximately equal to or greater than the required minimum velocity. Block 270 then transfers control to block 280.

In block 280, the controller waits for one or more of a user confirmation of the notification and a reconfiguration of the payload. The user may perform the reconfiguration of the payload. Alternatively, or additionally, a robotic appendage may perform the reconfiguration of the payload. For example, a robotic arm may perform the reconfiguration of the payload. Block 280 then transfers control to block 260.

Figure 3A:
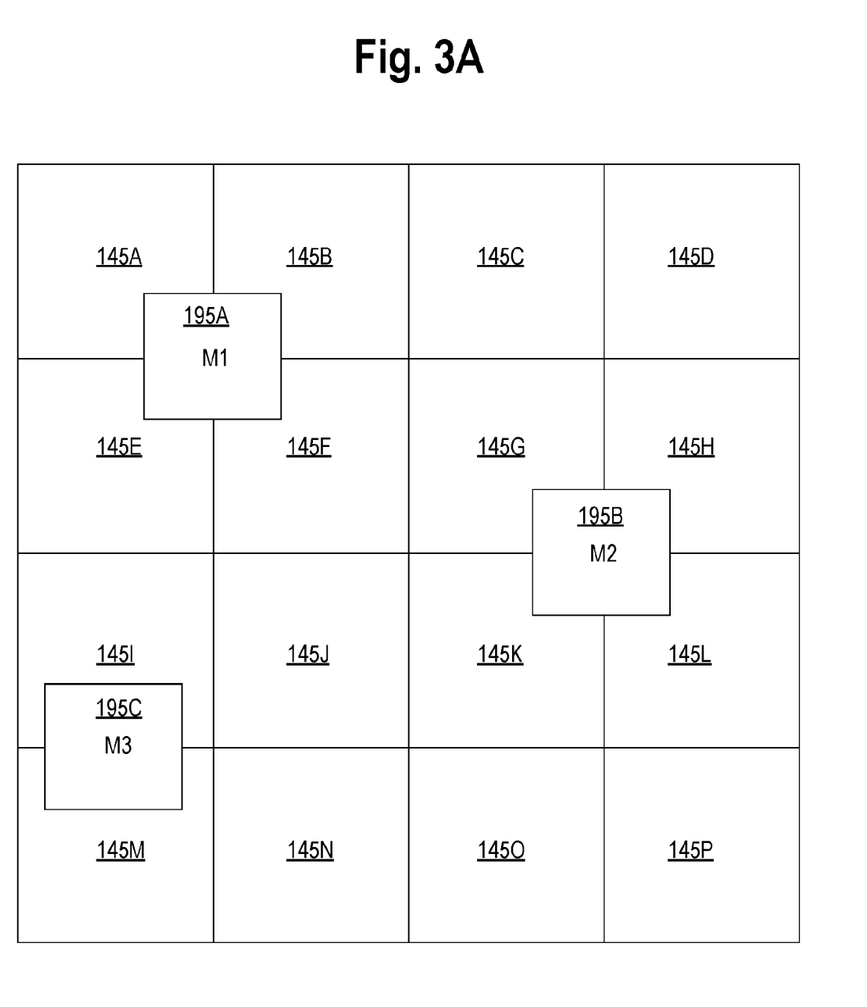
FIGS. 3A-3B are a pair of schematic diagrams illustrating a computation by a sensor array of the center of mass of the robotic payload pursuant to the method for determining and promoting safety of a robotic payload.
Figure 3B:
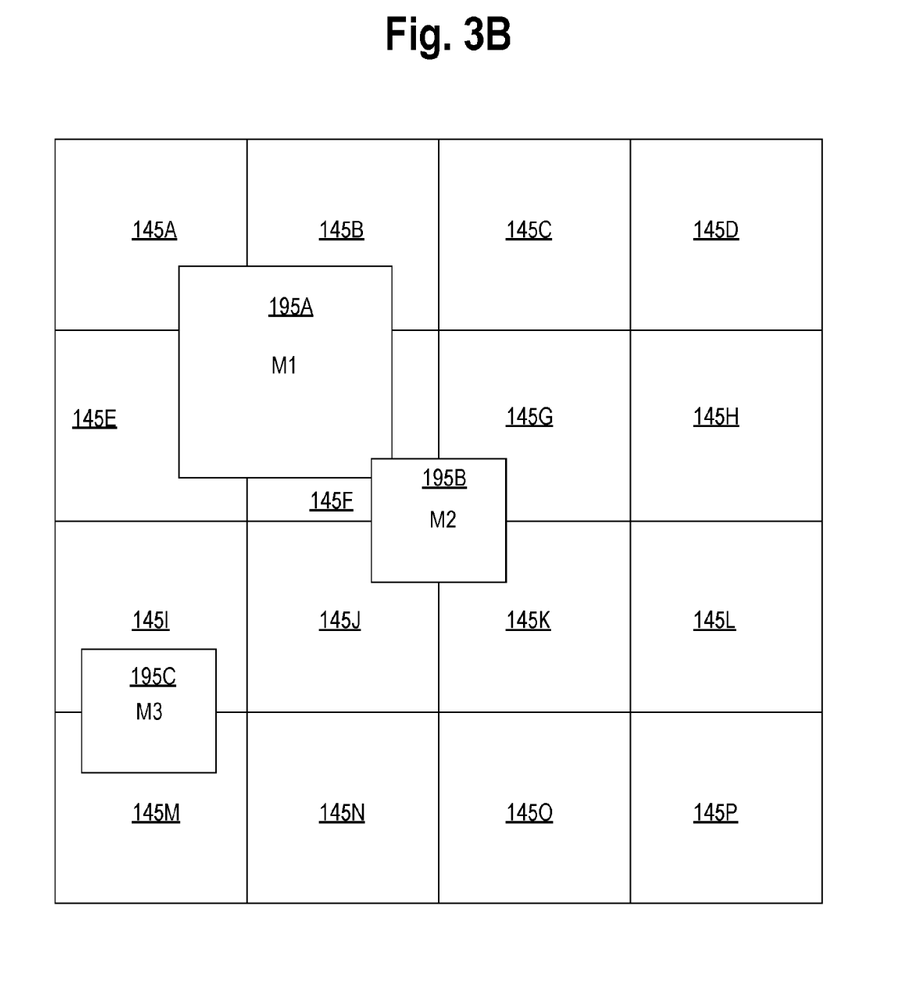

FIGS. 3A-3B are a pair of schematic diagrams illustrating a computation by a sensor array 140 of the center of mass of the robotic payload pursuant to the method for determining and promoting safety of a robotic payload (not shown in FIG. 3A; item 185 in FIG. 1B). FIGS. 3A and 3B show examples in which the center of mass is computed for a robotic payload that comprises a first payload item 195A having a first payload mass $M_1$, a second payload item 195B having a second payload mass $M_2$, and a third payload item 195C having a third payload mass $M_3$. In FIG. 3A, none of the three payload items 195A, 195B, and 195C overlaps each other. In FIG. 3B, the first payload item 195A overlaps with the second payload item 195B. As we will see, the overlap does not substantially affect the functioning of embodiments of the invention.

At least one of the first, second, and third payload items is positioned so as to be detectable by the sensor array 140. Preferably, although not necessarily, each of the first, second, and third payload items is positioned so as to be detectable by the sensor array 140. As depicted in FIGS. 3A and 3B, the sensor array 140 comprises sixteen sensors, a first sensor 145A, a second sensor 145B . . . and a sixteenth sensor 145P. For example, at least one of the first, second, and third payload items is positioned on the sensor array 140. Preferably, although not necessarily, each of the first, second, and third payload items is positioned on the sensor array 140.

For example, at least one of the sensors 145A, 145B . . . 145P is configured to sense the locations of one or more of the payload items. For example, at least one of the sensors 145A, 145B . . . 145P is mounted under the payload region of the robot.

For example, at least one of the sensors 145A, 145B . . . 145P is mounted under the payload region of the robot. Preferably, although not necessarily, each of the sensors 145A, 145B . . . 145P is mounted under the payload region of the robot 110.

The controller 120 computes the center of mass of the robotic payload 185 using one or more of a location of one or more the sensors 145A, 145B . . . 145P, a first payload mass $M_1$, a second payload mass $M_2$, a third payload mass $M_3$ . . . and an i-th payload mass $M_i$. In this example, three payload masses are used for simplicity. The controller is further configured to select locations for a first payload mass $M_1$, a second payload mass $M_2$, a third payload mass $M_3$ . . . and an i-th payload mass $M_i$ to optimize the computation of the center of mass of the robotic payload 185.

The first payload mass $M_1$ is detected by a first subset of the sensors 145A, 145B . . . 145P. The second payload mass $M_2$ is detected by a second subset of the sensors 145A, 145B . . . 145P. The third payload mass $M_3$ is detected by a third subset of the sensors 145A, 145B . . . 145P.

For example, the first payload mass $M_1$ comprises a mass of the first payload item 195A. For example, the second payload mass $M_2$ comprises a mass of the second payload item 195B. For example, the third payload mass $M_3$ comprises the mass of the third payload item 195C.

Alternatively, or additionally, the controller 120 is configured to concatenate payload mass measurements $M_1$, $M_2$, and $M_3$ that may be linear combinations of masses of the payload items 195A, 195B, 195C . . . in order to calculate one or more of the first payload mass $M_1$, the second payload mass $M_2$, the third payload mass $M_3$, . . . and an i-th payload mass $M_i$.

As depicted in FIG. 3A, the first payload mass $M_1$ comprises a sum of the masses detected by the first sensor 145A, the second sensor 145B, the fifth sensor 145E, and the sixth sensor 145F. That is, the first subset of the sensors comprises the first sensor 145A, the second sensor 145B, the fifth sensor 145E, and the sixth sensor 145F.

As depicted in FIG. 3A, the second payload mass $M_2$ comprises a sum of the masses detected by the seventh sensor 145G, the eighth sensor 145H, the eleventh sensor 145K, and the twelfth sensor 145L. That is, the second subset of the sensors comprises the seventh sensor 145G, the eighth sensor 145H, the eleventh sensor 145K, and the twelfth sensor 145L.

As depicted in FIG. 3A, the third payload mass $M_3$ comprises a sum of the masses detected by the ninth sensor 145I and the thirteenth sensor 145M. That is, the third subset of the sensors comprises the ninth sensor 145I and the thirteenth sensor 145M.

As depicted in FIG. 3B, the first payload mass $M_1$ comprises a sum of the masses detected by the first sensor 145A, the second sensor 145B, the fifth sensor 145E, and the sixth sensor 145F. That is, the first subset of the sensors comprises the first sensor 145A, the second sensor 145B, the fifth sensor 145E, and the sixth sensor 145F.

As depicted in FIG. 3B, the second payload mass $M_2$ comprises a sum of the masses detected by the sixth sensor 145F, the seventh sensor 145G, the eighth sensor 145H, the tenth sensor 145J, and the eleventh sensor 145K. That is, the second subset of the sensors comprises the sixth sensor 145F, the seventh sensor 145G, the eighth sensor 145H, the tenth sensor 145J, and the eleventh sensor 145K.

As depicted in FIG. 3B, the third payload mass $M_3$ comprises a sum of the masses detected by the ninth sensor 145I and the thirteenth sensor 145M. That is, the third subset of the sensors comprises the ninth sensor 145I and the thirteenth sensor 145M.

In the case of a resistive sensor, the sensor array 140 could, for example, comprise a Wheatstone bridge. Alternatively, or additionally, the sensor array 140 could comprise an apparatus other than a Wheatstone bridge. As pressure is applied to the sensor, the resistance changes in one leg of the circuit. The resistance change can be computed by measuring the voltage change. This voltage change then can be used to compute the pressuring being applied to the sensor array 140.

For example, the x and y coordinates of the center of mass $x_{cm}$ and $y_{cm}$ can be computed according to equations (1) as follows:

$$x_{cm} = \frac{1}{M}\Sigma M_i Rx_i \qquad (1)$$
$$= \frac{M_1*(Rx_1 + Rx_2 + Rx_5 + Rx_6) + M_2*(Rx_7 + Rx_6 + Rx_{11} + Rx_{10}) + M_3*(Rx_9 + Rx_{13})}{M_1 + M_2 + M_3}$$

$$y_{cm} = \frac{1}{M}\Sigma M_i Ry_i$$
$$= \frac{M_1*(Ry_1 + Ry_2 + Ry_5 + Ry_6) + M_2*(Ry_7 + Ry_6 + Ry_{11} + Ry_{10}) + M_3*(Ry_9 + Ry_{13})}{M_1 + M_2 + M_3}$$

where M is the total payload mass, $M_i$ is the mass of the i-th payload, $Ry_i$ is the difference between the y coordinates of the i-th sensor and the sensor center 320, and Rx is the difference between the x coordinates of the i-th sensor and the sensor center 320.

This method could be extended to compute an estimated center of mass using a camera or depth camera by measuring a height of an object relative to the sensor array.

For example, the controller may use equation (2) to compute a linear velocity of the robot based on the x coordinate $x_{cm}$ of the center of mass of the payload:

$$\text{linear\_velocity} = \frac{\text{payload\_mass}}{\text{total\_mass}} \times \quad (2)$$
$$\left(1 - \frac{x_{cm}}{0.5 \times \text{robot\_length}}\right) \times \text{default\_maximum\_linear\_velocity},$$

where linear_velocity is the linear velocity of the robot, payload_mass is the mass of the payload, total_mass is the total mass of the robot plus the payload, robot_length is the length of the robot along the x axis, and default_maximum_linear_velocity is the maximum velocity that the robot can safely have.

The controller may use equation (3) to compute an angular velocity of the robot based on the y coordinate $y_{cm}$ of the center of mass of the payload:

$$\text{angular\_velocity} = \frac{\text{payload\_mass}}{\text{total\_mass}} \times \quad (3)$$
$$\left(1 - \frac{y_{cm}}{0.5 \times \text{robot\_width}}\right) \times \text{default\_maximum\_angular\_velocity},$$

where angular_velocity is the angular velocity of the robot, payload_mass is again the mass of the payload, total_mass is again the total mass of the robot plus the payload, robot_width is the width of the robot along the y axis, and default_maximum_angular_velocity is the maximum angular velocity that the robot can safely have.

Figure 4:
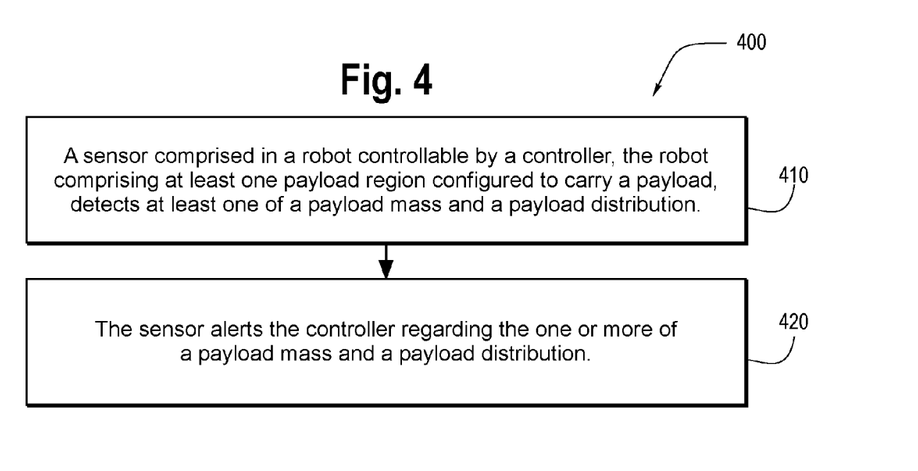
FIG. 4 is a flow chart of a method for determining and promoting safety of a robotic payload.

FIG. 4 is a flow chart of a method for determining and promoting safety of a robotic payload.

The order of the steps in the method 400 is not constrained to that shown in FIG. 4 or described in the following discussion. Several of the steps could occur in a different order without affecting the final result.

In step 410, a sensor comprised in a robot controllable by a controller, the robot comprising at least one payload region configured to carry a payload, detects at least one of a payload mass and a payload distribution. Block 410 then transfers control to block 420.

In step 420, the sensor alerts the controller regarding the one or more of a payload mass and a payload distribution. Block 420 then terminates the process.

Figure 5:
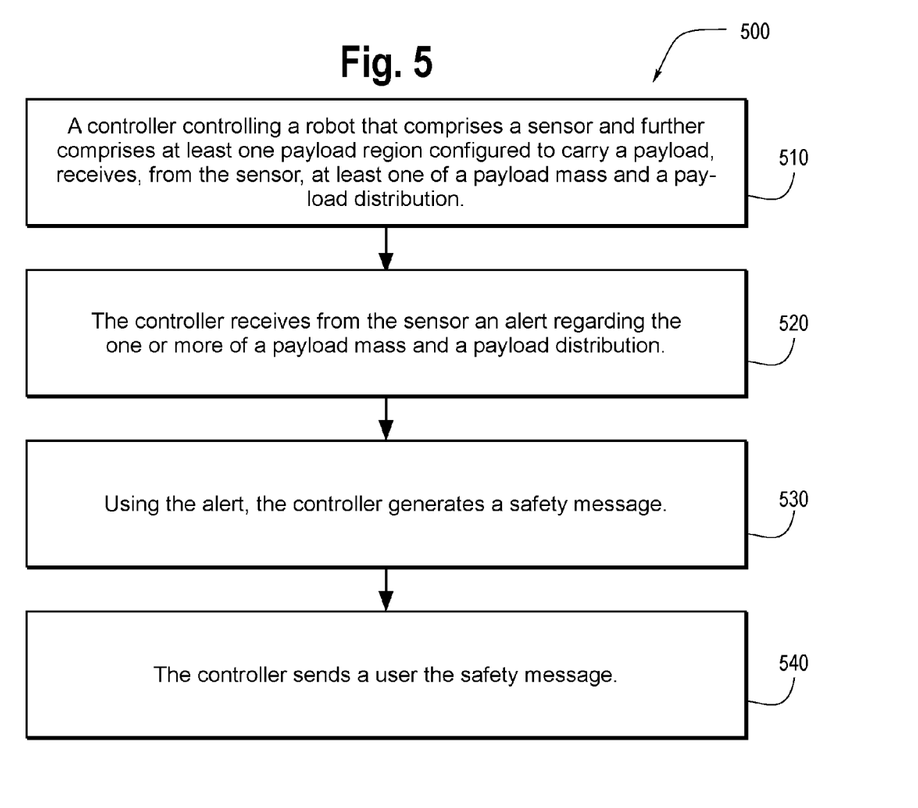
FIG. 5 is a flow chart of a method for determining and promoting safety of a robotic payload.

FIG. 5 is a flow chart of a method for determining and promoting safety of a robotic payload.

The order of the steps in the method 500 is not constrained to that shown in FIG. 4 or described in the following discussion. Several of the steps could occur in a different order without affecting the final result.

In step 510, a controller controlling a robot that comprises a sensor and further comprises at least one payload region configured to carry a payload, receives, from the sensor, at least one of a payload mass and a payload distribution. Block 510 then transfers control to block 520.

In step 520, the controller receives from the sensor an alert regarding the one or more of a payload mass and a payload distribution. Block 520 then transfers control to block 530.

In step 530, using the alert, the controller generates a safety message. Block 530 then transfers control to block 540.

In step 540, the controller sends a user the safety message. Block 540 then terminates the process.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. Other representative embodiments can be implemented using one or more of different configurations and different components.

For example, it will be understood by those skilled in the art that software used by the system and method for determining and promoting safety of robotic payload may be located in any location in which it may be accessed by the system. For example, it will be understood by one of ordinary skill in the art that the order of certain fabrication steps and certain components can be altered without substantially impairing the functioning of the invention. It is intended, therefore, that the subject matter in the above description shall be interpreted as illustrative and shall not be interpreted in a limiting sense.

What is claimed is:

1. A system for determining and promoting safety of a robotic payload, comprising:
   a controller; and
   a robot controllable by the controller,
      the robot comprising:
         at least one payload region configured to carry a payload;
         a sensor array configured to detect a payload parameter, wherein
            the payload parameter comprises one or more of a payload mass and a payload distribution,
            the sensor array further configured to alert the controller regarding the payload parameter,
            the controller further configured to use the alert to generate a safety message, the controller further configured to send the safety message to a user.

2. The system of claim 1, wherein the alert reports a change in the payload parameter.

3. The system of claim 1, wherein the robot comprises the controller.

4. The system of claim 1, wherein the robot comprises a robotic base, the robotic base comprising the sensor array.

5. The system of claim 4, wherein the robotic base comprises a mobile robotic base.

6. The system of claim 1, wherein the sensor array comprises at least two sensors.

7. The system of claim 1, wherein the controller is configured to determine if a payload mass differs significantly from an expected payload mass.

8. The system of claim 1, wherein the controller is configured to determine if a payload distribution needs to be adjusted.

9. The system of claim 1, wherein the controller is configured to determine whether it is safe for the robot to continue operating.

10. The system of claim 9, wherein the controller is configured, upon determining that it is not safe for the robot to continue operating, to order the robot to stop.

11. The system of claim 1, wherein the controller is configured to adjust, in response to the alert, one or more of a linear velocity, an angular velocity, a path, and a payload of the robot.

12. The system of claim 1, wherein the controller is further configured to perform, in response to the alert, one or more of stopping the robot, notifying a human operator, reconfiguring the payload, and taking an other step to promote payload safety.

13. A system for determining and promoting safety of a robotic payload, comprising:
a controller; and
a robot controllable by the controller,
the robot comprising:
at least one payload region configured to carry a payload;
a sensor array configured to detect a payload parameter,
the sensor array further configured to alert the controller regarding the payload parameter,
the controller further configured to use the alert to generate a safety message, the controller further configured to send the safety message to a user, wherein the controller is further configured to perform, in response to the alert, one or more of stopping the robot, notifying a human operator, reconfiguring the payload, and taking an other step to promote payload safety, wherein the controller provides instructions to a user to reconfigure the payload.

14. A system for determining and promoting safety of a robotic payload, comprising:
a controller; and
a robot controllable by the controller,
the robot comprising:
at least one payload region configured to carry a payload;
a sensor array configured to detect a payload parameter,
the sensor array further configured to alert the controller regarding the payload parameter,
the controller further configured to use the alert to generate a safety message, the controller further configured to send the safety message to a user, wherein the controller is further configured to perform, in response to the alert, one or more of stopping the robot, notifying a human operator, reconfiguring the payload, and taking an other step to promote payload safety, wherein the controller directs a robotic appendage to reconfigure the payload.

15. The system of claim 1, wherein the alert comprises notification of one or more of a change in payload mass and a change in payload distribution.

16. The system of claim 1, wherein the safety message comprises one or more of a safety determination and a safety promotion order.

17. The system of claim 1, wherein the sensor array comprises a Wheatstone bridge.

18. The system of claim 1, wherein the controller is further configured to compute a center of mass of the robotic payload.

19. A system for determining and promoting safety of a robotic payload, comprising:
a controller; and
a robot controllable by the controller,
the robot comprising:
at least one payload region configured to carry a payload;
a sensor array configured to detect a payload parameter,
the sensor array further configured to alert the controller regarding the payload parameter,
the controller further configured to use the alert to generate a safety message, the controller further configured to send the safety message to a user, wherein the controller is further configured to compute a center of mass of the robotic payload, wherein the x and y coordinates of the center of mass $x_{cm}$ and $y_{cm}$ are computed as follows:

$$x_{cm} = \frac{1}{M}\Sigma m_i Rx_i$$
$$= \frac{W_1*(Rx_{S1}+Rx_{S2}+Rx_{S5}+Rx_{S6})+W_2*(Rx_{S7}+Rx_{S8}+Rx_{S11}+Rx_{S12})+W_3*(Rx_{S9}+Rx_{S13})}{W_1+W_2+W_3}$$

$$y_{cm} = \frac{1}{M}\Sigma m_i Ry_i$$
$$= \frac{W_1*(Ry_{S1}+Ry_{S2}+Ry_{S5}+Ry_{S6})+W_2*(Ry_{S7}+Ry_{S8}+Ry_{S11}+Ry_{S12})+W_3*(Ry_{S9}+Ry_{S13})}{W_1+W_2+W_3},$$

where M is a total payload mass, $M_i$ is a mass of the i-th payload, $Ry_i$ is a difference between y coordinates of the i-th sensor and a sensor center, and Rx is a difference between x coordinates of the i-th sensor and the sensor center.

20. A system for determining and promoting safety of a robotic payload, comprising:
a controller; and
a robot controllable by the controller,
the robot comprising:
at least one payload region configured to carry a payload;
a sensor array configured to detect a payload parameter,
the sensor array further configured to alert the controller regarding the payload parameter,
the controller further configured to use the alert to generate a safety message, the controller further configured to send the safety message to a user, wherein the controller is configured to adjust, in response to the alert, one or more of a linear velocity, an angular velocity, a path, and a payload of the robot, wherein the linear velocity is computed as follows:

$$\text{linear\_velocity} = \frac{\text{payload\_mass}}{\text{total\_mass}} \times \left(1 - \frac{x_{cm}}{0.5 \times \text{robot\_length}}\right) \times \text{default\_maximum\_linear\_velocity},$$

where linear_velocity is the linear velocity of the robot, payload_mass is the mass of the payload, total_mass is the total mass of the robot plus the payload, robot_length is the length of the robot along the x axis, and default_maximum_linear_velocity is the maximum velocity that the robot can safely have.

21. A system for determining and promoting safety of a robotic payload, comprising:
a controller; and
a robot controllable by the controller,
the robot comprising:
at least one payload region configured to carry a payload;
a sensor array configured to detect a payload parameter, the sensor array further configured to alert the controller regarding the payload parameter, the controller further configured to use the alert to generate a safety message, the controller further configured to send the safety message to a user, wherein the controller is configured to adjust, in response to the alert, one or more of a linear velocity, an angular velocity, a path, and a payload of the robot, wherein the angular velocity is computed as follows:

$$\text{angular\_velocity} = \frac{\text{payload\_mass}}{\text{total\_mass}} \times \left(1 - \frac{y_{cm}}{0.5 \times \text{robot\_width}}\right) \times \text{default\_maximum\_angular\_velocity},$$

where angular_velocity is the angular velocity of the robot, payload_mass is again the mass of the payload, total_mass is again the total mass of the robot plus the payload, robot_width is the width of the robot along the y axis, and default_maximum_angular_velocity is the maximum angular velocity that the robot can safely have.

22. A method for determining and promoting safety of a robotic payload, comprising:

detecting, by a sensor comprised in a robot controllable by a controller, the robot comprising at least one payload region configured to carry a payload, at least one of a payload mass and a payload distribution; and alerting the controller, by the sensor, regarding the one or more of a payload mass and a payload distribution.

23. The method of claim 22, wherein the step of alerting comprises notifying the controller of one or more of a change in payload mass and a change in payload distribution.

24. A method for determining and promoting safety of a robotic payload, comprising:

receiving, by a controller controlling a robot that comprises a sensor and further comprises at least one payload region configured to carry a payload, from the sensor, at least one of a payload mass and a payload distribution;

receiving, by the controller, from the sensor, an alert regarding the one or more of a payload mass and a payload distribution;

generating, by the controller, using the alert, a safety message; and sending, by the controller, to a user, the safety message.

25. The method of claim 24, wherein the step of sending comprises sending one or more of a safety determination and an order.

26. The method of claim 24, wherein the step of generating comprises generating an order promoting the safety of the payload.

27. The method of claim 24, wherein the step of generating comprises determining if the payload mass differs significantly from an expected payload mass.

28. The method of claim 24, wherein the step of generating comprises determining if the payload distribution needs to be adjusted.

29. The method of claim 26, wherein the step of generating further comprises generating one or more of an order to adjust the robot's movement, an order notifying a human operator, an order ordering the robot to stop and an order taking another step to promote payload safety.

30. The method of claim 29, wherein the step of generating an order to adjust the robot's movement further comprises adjusting one or more of the robot's path, the robot's linear velocity, the robot's angular velocity, and the robot's acceleration.

31. A method for determining and promoting safety of a robotic payload, comprising:

receiving, by a controller controlling a robot that comprises a sensor and further comprises at least one payload region configured to carry a payload, from the sensor, at least one of a payload mass and a payload distribution;

receiving, by the controller, from the sensor, an alert regarding the one or more of a payload mass and a payload distribution;

generating, by the controller, using the alert, a safety message; and sending, by the controller, to a user, the safety message, wherein the step of generating comprises generating an order promoting the safety of the payload, wherein the step of generating further comprises generating one or more of an order to adjust the robot's movement, an order notifying a human operator, an order ordering the robot to stop and an order taking another step to promote payload safety, wherein the step of generating an order to adjust the robot's linear velocity comprises computing the robot's linear velocity as follows:

$$\text{linear\_velocity} = \frac{\text{payload\_mass}}{\text{total\_mass}} \times \left(1 - \frac{x_{cm}}{0.5 \times \text{robot\_length}}\right) \times \text{default\_maximum\_linear\_velocity},$$

where linear_velocity is the linear velocity of the robot, payload_mass is the mass of the payload, total_mass is the total mass of the robot plus the payload, robot_length is the length of the robot along the x axis, and default_maximum_linear_velocity is the maximum velocity that the robot can safely have.

32. A method for determining and promoting safety of a robotic payload, comprising:

receiving, by a controller controlling a robot that comprises a sensor and further comprises at least one payload region configured to carry a payload, from the sensor, at least one of a payload mass and a payload distribution;

receiving, by the controller, from the sensor, an alert regarding the one or more of a payload mass and a payload distribution;

generating, by the controller, using the alert, a safety message; and sending, by the controller, to a user, the safety message, wherein the step of generating comprises generating an order promoting the safety of the payload, wherein the step of generating further comprises generating one or more of an order to adjust the robot's movement, an order notifying a human operator, an order ordering the robot to stop and an order taking another step to promote payload safety, wherein the step of generating an order to adjust the robot's angular velocity comprises computing the robot's angular velocity as follows:

$$\text{angular\_velocity} = \frac{\text{payload\_mass}}{\text{total\_mass}} \times$$
$$\left(1 - \frac{y_{cm}}{0.5 \times \text{robot\_width}}\right) \times \text{default\_maximum\_angular\_velocity},$$

where angular_velocity is the angular velocity of the robot, payload_mass is again the mass of the payload, total_mass is again the total mass of the robot plus the payload, robot_width is the width of the robot along the y axis, and default_maximum_angular_velocity is the maximum angular velocity that the robot can safely have.

33. The method of claim 24, wherein the step of generating comprises determining whether it is safe for the robot to continue operating.

34. The method of claim 33, wherein the step of generating comprises, upon determining that it is not safe for the robot to continue operating, ordering the robot to stop.

35. A method for determining and promoting safety of a robotic payload, comprising:
  receiving, by a controller controlling a robot that comprises a sensor and further comprises at least one payload region configured to carry a payload, from the sensor, at least one of a payload mass and a payload distribution;
  receiving, by the controller, from the sensor, an alert regarding the one or more of a payload mass and a payload distribution;
  generating, by the controller, using the alert, a safety message; and
  sending, by the controller, to a user, the safety message, wherein the step of sending comprises providing instructions to a user to reconfigure the payload.

36. A method for determining and promoting safety of a robotic payload, comprising:
  receiving, by a controller controlling a robot that comprises a sensor and further comprises at least one payload region configured to carry a payload, from the sensor, at least one of a payload mass and a payload distribution;
  receiving, by the controller, from the sensor, an alert regarding the one or more of a payload mass and a payload distribution;
  generating, by the controller, using the alert, a safety message; and
  sending, by the controller, to a user, the safety message, wherein the step of sending comprises directing a robotic appendage to reconfigure the payload.

37. The method of claim 24, wherein the step of generating comprises computing a center of mass of the robotic payload.

38. The method of claim 37, wherein the step of computing a center of mass of the robotic payload comprises computing the x and y coordinates of the center of mass $x_{cm}$ and $y_{cm}$ as follows:

$$x_{cm} = \frac{1}{M} \Sigma m_i Rx_i$$
$$= \frac{W_1 * (Rx_{S1} + Rx_{S2} + Rx_{S5} + Rx_{S6}) + W_2 * (Rx_{S7} + Rx_{S8} + Rx_{S11} + Rx_{S12}) + W_3 * (Rx_{S9} + Rx_{S13})}{W_1 + W_2 + W_3}$$

$$y_{cm} = \frac{1}{M} \Sigma m_i Ry_i$$
$$= \frac{W_1 * (Ry_{S1} + Ry_{S2} + Ry_{S5} + Ry_{S6}) + W_2 * (Ry_{S7} + Ry_{S8} + Ry_{S11} + Ry_{S12}) + W_3 * (Ry_{S9} + Ry_{S13})}{W_1 + W_2 + W_3},$$

where M is a total payload mass, $M_i$ is a mass of the i-th payload, $Ry_i$ is a difference between y coordinates of the i-th sensor and a sensor center, and Rx is a difference between x coordinates of the i-th sensor and the sensor center.

* * * * *